(12) United States Patent
Chakravarthy

(10) Patent No.: US 7,702,698 B1
(45) Date of Patent: Apr. 20, 2010

(54) DATABASE REPLICATION ACROSS DIFFERENT DATABASE PLATFORMS

(75) Inventor: Susarla Chakravarthy, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 520 days.

(21) Appl. No.: 11/070,724

(22) Filed: Mar. 1, 2005

(51) Int. Cl.
*G06F 12/00* (2006.01)

(52) U.S. Cl. ....................... 707/804; 707/809

(58) Field of Classification Search ............... 707/200, 707/202
See application file for complete search history.

(56) References Cited

U.S. PATENT DOCUMENTS

| | | | | |
|---|---|---|---|---|
| 4,714,995 | A * | 12/1987 | Materna et al. | 707/201 |
| 6,321,236 | B1 * | 11/2001 | Zollinger et al. | 707/203 |
| 6,615,223 | B1 * | 9/2003 | Shih et al. | 707/201 |
| 6,832,229 | B2 * | 12/2004 | Reed | 707/202 |
| 2004/0111726 | A1 * | 6/2004 | Dilley et al. | 719/310 |
| 2004/0254919 | A1 * | 12/2004 | Giuseppini | 707/3 |
| 2005/0114285 | A1 * | 5/2005 | Cincotta | 707/1 |
| 2005/0187991 | A1 * | 8/2005 | Wilms et al. | 707/204 |

OTHER PUBLICATIONS

Pantano, Maximizing Accuracy in Large Data Conversion, IT Pro, Sep. | Oct. 1999, pp. 30-36, IEEE.*
Gennick et al., "Oracle SQL *Loader: the Deinitive Guide", Apr. 2001, O'Reilly.*
MySQL 5.0 Reference Manual, "dev.mysql.com", Released 2003.*
Thompson (1997). "Database Replication: Comparing Three Leading DBMS Vendors' Approaches to Replication," DBMS and Internet Systems, Miller Freeman, Inc., located at <http://www.dbmsmag.com/9705d15.html> visited on May 3, 2007, 10 pages.

* cited by examiner

Primary Examiner—Cam Y T Truong

(57) ABSTRACT

Database replication across different database platforms is carried out by transforming a binary log of database updates made to a first database into an SQL loader format of a second database and then processing the transformed log of updates into the second database. The transformation of the binary log includes the step of parsing the binary log into SQL statements, storing the SQL statements as a flat file, and transforming the flat file into an input file having the SQL loader format of the second database. The metadata of the flat files is stored in a separate database. As the flat files are transformed into input files of the second database, the status of the flat files is updated in the metadata database.

11 Claims, 4 Drawing Sheets

DATABASE REPLICATION ACROSS DIFFERENT DATABASE PLATFORMS

BACKGROUND OF THE INVENTION

1. Field of the Invention

The present invention relates generally to database replication, and more particularly, to a database replication method and system that works across different database platforms.

2. Description of the Related Art

Database replication is the process of copying and maintaining data on multiple servers. Database replication solutions may be provided by the database software providers or by third parties. An article by Charles Thomson entitled, "Database Replication" discusses database replication solutions offered by Microsoft Corp., Oracle Corp. and Sybase Inc.

MySQL AB also provides a database replication solution for use with its MySQL® database software. With this solution, data written to a master server is replicated on one or more slave servers. The master server writes updates to its binary logs, and the binary logs serve as a record of updates to be sent to the slave servers. When a slave server connects to the master server, it informs the master of its last position within the logs since the last successful update. The slave catches up on any updates that have occurred since that time and then waits for the master to notify it of new updates.

In each of the database replication solutions discussed above, database replication is being performed across the same database platform. They cannot perform database replication in hybrid database configurations, where the source database server runs one type of database software and the destination database server runs a different type of database software.

Hybrid database configurations are sometimes used to take advantage of the benefits offered by the different types of database software. For example, the MySQL® database offers speed, ease of use, low maintenance and low cost, while the Oracle® database is commonly used to handle complex database tasks and high volumes of data. When a particular application requires handling of both small and large data volumes, both the MySQL® database and the Oracle® database might be used. In such a case, all new data and data updates would be entered directly into the MySQL® database and maintained there for a period of time for quick access and then purged thereafter. The Oracle® database, by contrast, would collect all data and be used for applications like downstream reporting and other complex database tasks. This hybrid configuration would be desirable, because the MySQL® database performs well with small amounts of data while the Oracle® database performs well with large amounts of data and provides additional features, such as the ability to distribute the data by doing partitions, clusters, etc.

As noted previously, current database replication solutions are not applicable to hybrid database configurations. One way to replicate data in a hybrid database configuration would be to pass data updates in parallel to the different databases. This technique, however, is not desirable, because: (1) it requires more time in completing the data updates; and (2) it is difficult to keep the different databases fully synchronized. Also, a failure in storing the data updates in parallel would likely cause data inconsistency and cause the data in the different databases to be out of sync.

SUMMARY OF THE INVENTION

The present invention provides a database replication method and system that is applicable to hybrid database configurations. In accordance with an embodiment of the present invention, the binary logs of the database updates made to a first database are read and parsed into plain SQL statements. The plain SQL statements are stored in a staging area as flat files whose metadata is kept in a database. These flat files are processed sequentially and transformed into an SQL loader format of a second database before it is processed into the second database. The status of the flat files is then updated in the metadata database.

The present invention is particularly applicable to replicating MySQL® databases because they can be configured to generate binary logs of database updates made to them. These binary logs are read using a 'mysqlbinlog' utility that is provided with the MySQL® database software, which permits these binary logs to be examined in text format, and then parsed into plain SQL statements.

According to an aspect of the invention, if the data volumes are high, the flat files are zipped and copied directly onto the second database server. Processing the flat files into the second database in this manner would be faster than processing them into the second database over the network.

The database replication system according to an embodiment of the invention includes a first database server programmed to receive inputs from users and generate a log of edits made by the users to a first database, and a second database server programmed to receive as inputs to a second database the log of edits that has been transformed into an SQL loader format of the second database. The database replication system may also include another database server programmed to receive as inputs to an additional database the log of edits that has been transformed into an SQL loader format of the additional database.

The present invention further provides a computer-readable medium having program instructions to be executed in a database replication system to carry out the steps of transforming a log of edits made to a first database into an SQL loader format of a second database and processing the transformed log of edits as an input to the second database.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
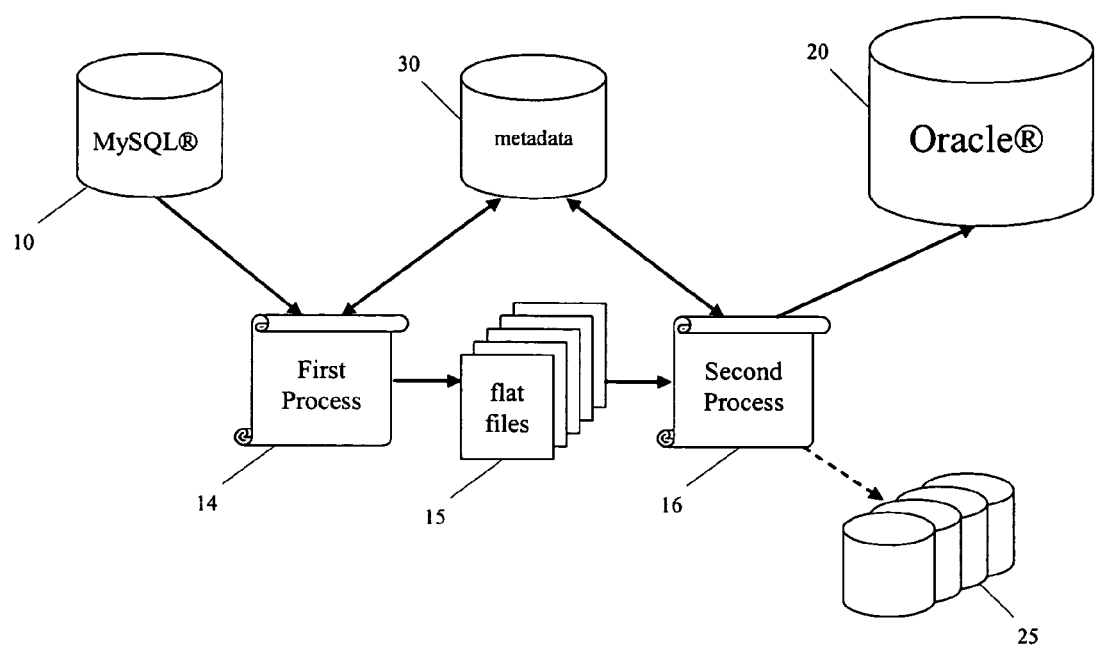
FIG. 1 illustrates a block diagram of a database replication system according to an embodiment of the invention.

FIG. 1 illustrates a block diagram of a database replication system according to an embodiment of the invention. The database replication system includes a source database server 10, a destination database server 20, and a metadata database server 30. The source database server 10 maintains a source database and the destination database server 20 maintains a destination database. FIG. 1 also illustrates a connection (shown by dotted lines) to additional destination database servers 25 that maintain additional destination databases. The database replication system including the additional database servers 25 represents an embodiment of the invention where database replication is performed on multiple destination databases.

In the embodiment of the invention illustrated in FIG. 1, the source database server 10 employs a MySQL® database that is configured as a master for master-slave database replication. As a master, the MySQL® database keeps a binary log that captures all updates to the database. The binary log also contains information about how long each statement that updated the database took and keeps track of the log position (which increases in value with passage of time) for each database update recorded in the binary log. The binary log may be examined as a text file using the mysqlbinlog utility that is made available with the MySQL® database software. The binary log is stored in a local memory of the source database server 10. When the binary log exceeds a certain size (e.g., 100 MB), a switch over to a new binary log takes place. A new binary log is generally identified with an extension number that is incremented from the highest current extension number. When the switch over to the new binary log takes place, the log position is not reset and takes on increasing values for the newly added updates. The binary logs are archived after a set period of time (e.g., 2-3 months).

The block diagram of FIG. 1 further illustrates two processes 14, 16 and flat files 15 generated by the first process 14 and used by the second process 16. FIG. 1 does not depict where the first process 14 and the second process 16 are carried out, because these processes can be executed by either the source destination server 10 or the destination database server 20. It is also possible to execute the two processes on a different server. In case of heavy data volumes, however, it is preferable to have the destination database server 20 carry out the second process 16 to reduce the loading time as loading over the network connection between the two servers would be avoided.

When the flat files 15 are generated by the first process 14, the metadata for the flat files (e.g., name of the flat file, the table to be processed into a destination database, and whether the table was processed into the destination database) are stored in a metadata database maintained by the metadata database server 30. When the flat files 15 are processed into a destination database maintained by any of the destination database servers 20, 25, such processing of the flat files 15 is noted in the metadata database. A simple example of the metadata database for a database replication system having one source database and three destination databases is provided below.

| File Name | Table Name | Destination 1 | Destination 2 | Destination 3 |
|---|---|---|---|---|
| _124.sgl | AAA | Completed | Completed | Completed |
| _125.sgl | EMPT | Completed | Completed | Pending |
| _126.sgl | BBB | Pending | Pending | Pending |
| _127.sgl | CCC | Pending | Pending | Pending |
| _128.sgl | DDD | Pending | Pending | Pending |

Figure 2:
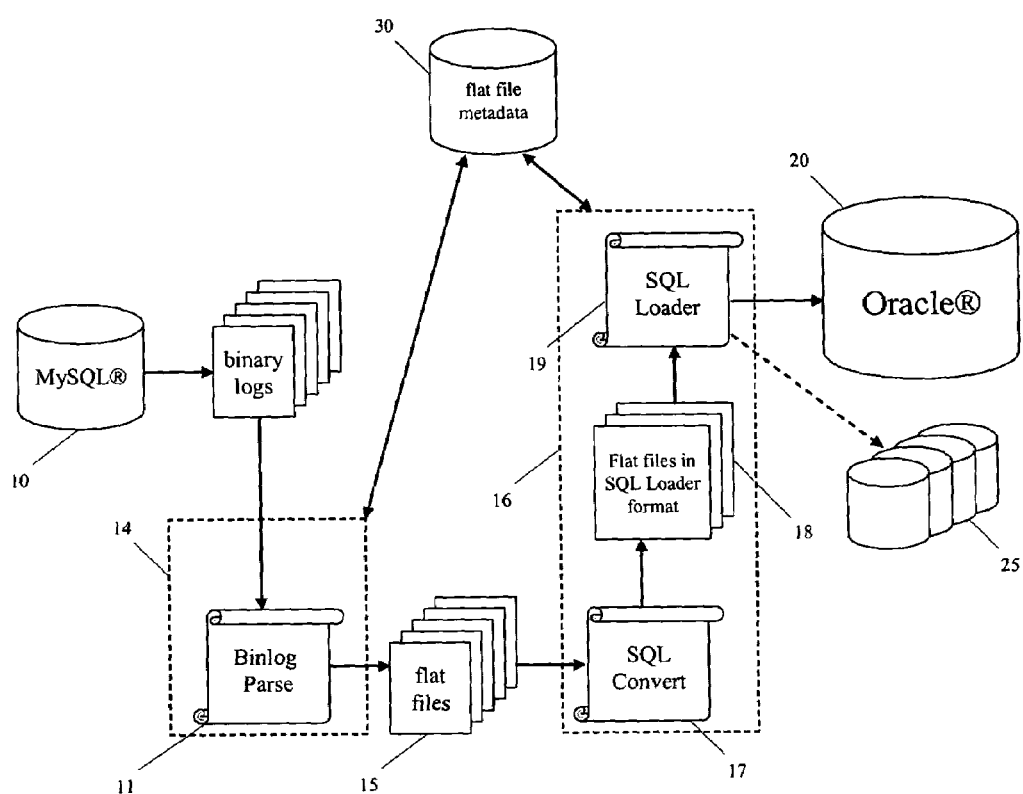
FIG. 2 illustrates the database replication system of FIG. 1 in additional detail.

Additional details of the first process 14 and the second process 16 are illustrated in FIG. 2. The first process 14 invokes a binlog parse process 11 to read the binary log that includes all of the updates to the source database using the mysqlbinlog utility and parse the binary log into flat files 15. A sample flat file 15 is provided below:

Flat File 15

```
#at 1526
#041224 2:49:47 server id 1 log_pos 1526 Query thread_id=42029 exec_time=0 error_code=0
SET TIMESTAMP=1103885387;
INSERT INTO EMP VALUES (120,'ROBERT', 10000,'Oct. 30, 2004 05:26:50');
#at 1611
#041224 2:49:47 server id 1 log_pos 1611 Query thread_id=42029 exec_time=0 error_code=0
SET TIMESTAMP=1103885387;
INSERT INTO EMP VALUES (130,'JULIA',10000,'Oct. 30, 2004 05:26:50');
#at 1695
#041224 2:49:47 server id 1 log_pos 1695 Query thread_id=42029 exec_time=0 error_code=0
SET TIMESTAMP=1103885387;
INSERT INTO EMP VALUES (140,'GEORGE', 10000,'Oct. 30, 2004 05:26:50');
```

The information that is obtained through the parsing includes: (1) timestamp; (2) log position; and (3) SQL statement. The log position associated with the last update is stored by the binlog parse process 11. In the above example, the log position of the last update is 1695. The next time the binlog parse process 11 is invoked to read and parse the binary log, the parsing will be performed for all updates that have log positions that are greater than 1695. When the updates that are to be parsed extend over more than one binary log, all of the binary logs that contain such updates are read and parsed.

Each of the flat files 15 is identified by a sequence_id which is unique. The flat files 15 that are later-created are given higher numbers for their sequence_id. For example, the flat files 15 may include __124.sql, __125.sql, __126.sql, __127.sql, amongst which __124.sql is created the earliest, then __125.sql, then __126.sql, and then __127.sql. The metadata for the flat files 15 that are generated in this manner are stored in the metadata database. The information stored in the metadata database includes the name of the flat file, the name of the table to be updated in the destination database by the flat file, and whether the processing of the updates in the flat file into a destination database is completed or pending. The table name used in the destination database, and stored in the metadata database, may or may not be the same as the table name used in the source database. Table names could be different because a table name used in the source database may be a restricted name in the destination database and vice versa. The mapping of the table names from the source database to the destination database is stored in the configuration file for the binlog parse process 11.

In the preferred embodiment, the flat files 15 are zipped and copied directly onto the destination database server 20 from where the second process 16 is carried out. Processing the flat files 15 into the destination database in this manner would be faster than processing them into the destination database over a network connection.

As illustrated in FIG. 2, the second process 16 includes an SQL convert process 17. Using this process, the flat files 15 are converted into SQL loader format flat files 18. The flat files 15 (in particular, those that have the status indication "Pending" in the metadata database) are processed sequentially in the order of their sequence_id into the destination database and the status of those flat files 15 that are processed is indicated as being "Completed" in the metadata database. A sample SQL loader format flat files 18 generated from the sample flat file 15 shown above and having fields delimited by CTRL-A is provided below:

| SQL loader format flat file 18 |
| --- |
| 120^AROBERT^A10000^AOct. 30, 2004 05:26:50 |
| 130^AJULIA^A1000^Oct. 30, 2004 05:26:50 |
| 140^AGEORGE^A10000^AOct. 30, 2004 05:26:50 |

The second process 16 further invokes an SQL loader process 19 to apply the updates in the SQL loader format flat files 18 onto various tables in the destination database. The tables in the destination database that are to be updated using the SQL loader process 19 are identified in the metadata database. Therefore, when the second process 16 is executed, each table name associated with the flat files 15 that are to be processed into SQL loader format flat files 18 is retrieved from the metadata database for use during the SQL loader process 19.

The SQL loader process 19 is a utility for bulk loading into a database that is provided with the database software. Upon applying the updates in the SQL loader format flat files 18 onto the destination database by invoking the SQL loader process 19, database updates made to the source database will have been fully replicated in the destination database. If multiple destination databases are designated for replication, the SQL loader process 19 for each of the destination databases are invoked to apply the updates in the SQL loader format flat files 18 onto the respective destination databases.

If the destination database is an Oracle® database, the SQL convert process 17 is configured to generate SQL loader format flat files 18 in the SQL loader format of the Oracle® database. If the destination database is a different database, the SQL convert process 17 is revised accordingly so that it will generate SQL loader format flat files 18 in the SQL loader format of that database.

Any changes to the data format are also handled by the SQL loader process 19. For example, the date format change (from 'yymmdd' format to the 'mm-dd-yy' format) would be handled by specifying the SQL loader control file of the destination database to expect a date in the 'yymmdd' format.

Figure 3:
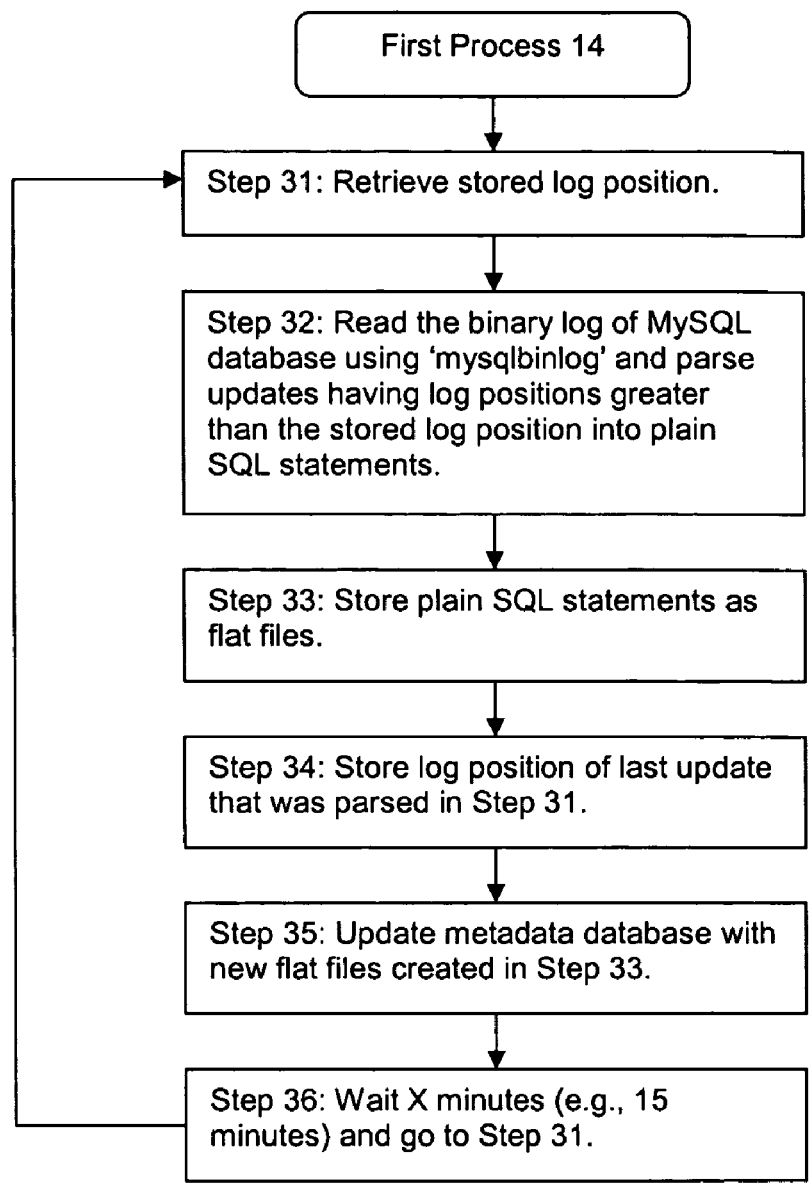
FIG. 3 is a flow diagram illustrating the steps for generating flat files comprising SQL statements from a log of database updates made to a source database.

FIG. 3 illustrates the steps carried out by the first process 14. In Step 31, the log position that was stored by the first process 14 as an indication of the last update that was parsed by the first process 14 is read. Then, in Step 32, the binary log of the source database is read using the mysqlbinlog utility and the updates recorded in the binary log having log positions that are greater than the stored log position are parsed into plain SQL statements. The plain SQL statements generated in this manner are stored as flat files (Step 33). In Step 34, the log position of the last update that was parsed in Step 32 is stored, and in Step 35, the metadata database is updated with the new flat files that were created in Step 33. Finally, in Step 36, the first process 14 waits a predetermined amount of time (e.g., 15 minutes) and then repeats Steps 31-36.

Figure 4:
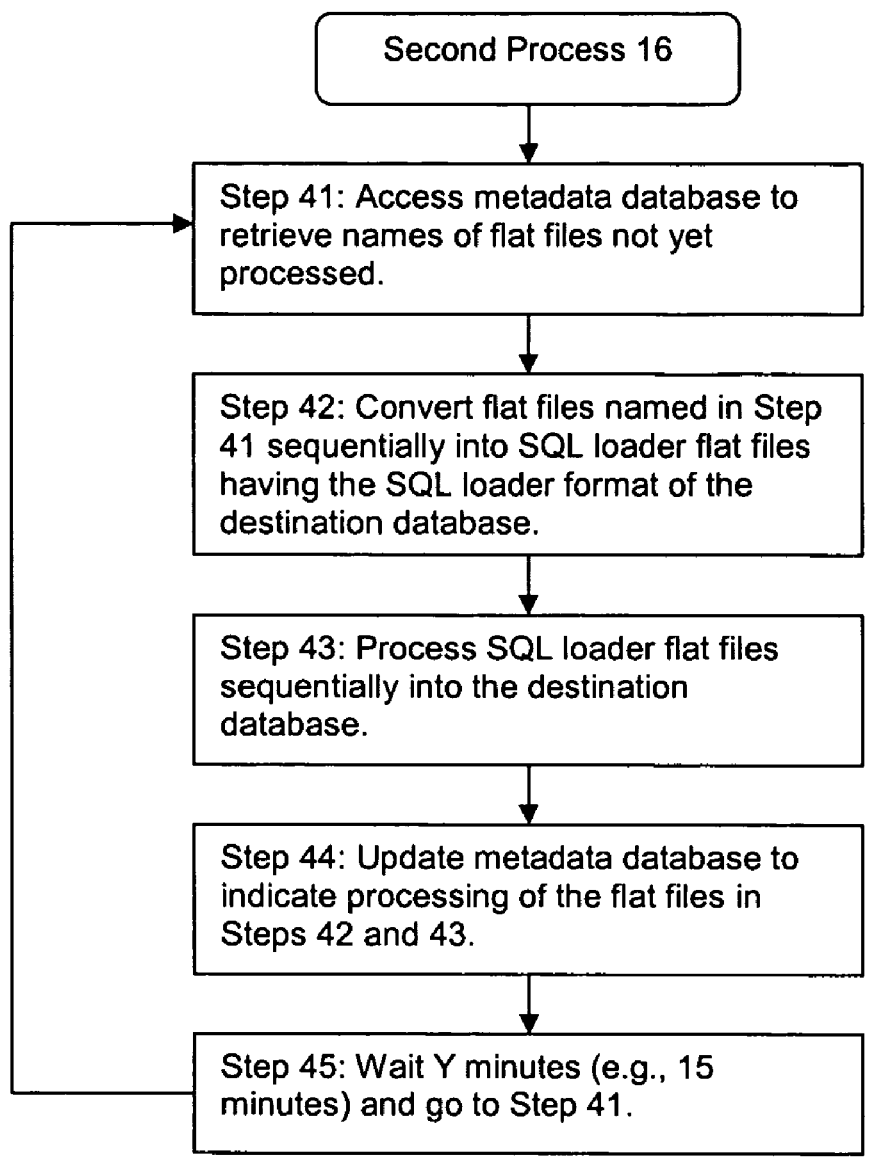
FIG. 4 is a flow diagram illustrating the steps for processing the flat files into a destination database.

FIG. 4 illustrates the steps carried out by the second process 16. These steps are executed for each of the destination databases in which the database updates made to the source database are to be replicated. For simplicity, the illustration provided in FIG. 4 applies to only one of the destination databases. In Step 41, the metadata database is accessed to retrieve names of the flat files not yet processed. Then, in Step 42, the flat files named in Step 41 are converted into SQL loader flat files having the SQL loader format of the destination database, and in Step 43, the SQL loader flat flies are processed sequentially into the destination database. In Step 44, the metadata database is updated to indicate processing of the flat files into the destination database. Finally, in Step 45, the second process 16 waits a predetermined amount of time (e.g., 15 minutes) and then repeats Steps 41-45.

The database replication according to the invention may be carried out in real-time, near real-time or in batch mode. To achieve database replication in real-time, the frequency of execution of the first process 14 and the second process 16 is increased by decreasing the amount of time that the first process 14 waits in Step 35 and the amount of time that the second process 16 waits in Step 45. For most practical purposes, a waiting time of 5 minutes for both the first process 14 and the second process 16 achieves real-time data replication.

The present invention may be applicable in failover situations to help recover data. For example, if there is a database crash, data can be recovered by carrying out the database replication process starting from the log position associated with the last update processed prior to the crash. Also, each SQL statement in the flat files 15 has an associated ID and an error log is configured to output an error message that includes the ID of the SQL statement that caused the error. Upon receiving the error message, an operator can intervene to fix the error, and then carry out the replication process starting from the SQL statement that caused the error.

A computer-readable medium according to an embodiment of the invention contains program instructions to be executed in a database replication system shown in FIG. 1 to carry out the steps of transforming a log of edits to a source database into an SQL loader format of a destination database and processing the transformed log of edits as an input to the destination database. Since these steps can be executed by either the source database server 10 or by the destination database server 20, the program instructions may be stored on a computer-readable medium associated with the source database server 10 or the destination database server 20, or stored on a removable computer-readable medium whose contents are to be copied onto the source database server 10 or the destination database server 20. A computer readable storage medium includes a memory.

While the foregoing is directed to embodiments of the present invention, other and further embodiments of the invention may be devised without departing from the basic scope thereof, and the scope thereof is determined by the claims that follow.

What is claimed is:

1. A method of replicating updates made to a first database in a second database, the method comprising:

reading a generated log of the updates, from a first position to a second position, related to the first database, wherein the log of the updates is a binary log and the first database is associated with a mysqlbinlog utility, wherein the mysqlbinlog utility is used to read the log of the updates;

parsing the log of the updates into a file comprising Structure Query Language (SQL) statements;

storing metadata related to the file comprising the SQL statements in a third database, wherein the metadata includes a processing status of the file and a file name associated with the file, wherein the first database is different from the third database;

transforming the file comprising the SQL statements into a SQL loader format of the second database, based in part upon the stored metadata in the third database, wherein the stored metadata is updated according to the processing status of the file;

processing the transformed file as an input to the second database to make at least one update to the second database; and reading the generated log of the updates, from a third position to a fourth position, related to the first database, for transforming the log of the updates as input to the second database, wherein information included in the log of the updates between the third position and the fourth position was generated after information included in the log of the updates between the first position and the second position, and information included between the third position and the fourth position is for updating at least one update of the second database, wherein the updates recorded in the binary log having log positions that are greater than stored log position are parsed into the SQL statements;

waiting a predetermined amount of time to repeat the transforming of the file and the processing of the transformed file for updating, wherein multiple files each comprising SQL statements are generated and tracked using the third database, wherein the third database is controlled by a third server, wherein the first database is controlled by a first server and the second database is controlled by a second server, and wherein the log of the updates is stored in a local memory of the first server and the transformed file is stored in a local memory of the second server, wherein the transforming of the file includes a transformation of data stored as dates and a transformation of table names.

2. The method according to claim 1, wherein the log of updates is read using the mysqlbinlog utility and parsed.

3. The method according to claim 1, further comprising recording a log position of the last item in the log of updates that has been parsed.

4. The method according to claim 3, wherein the updates in the log having log positions that are subsequent to the last recorded log position are parsed.

5. The method of claim 1, wherein the metadata includes information related to a table to be updated in the second database and corresponding SQL statements.

6. A database replication system comprising:

a first database server programmed to receive inputs from users and generate a log of edits made by the users to a first database, wherein the log of edits is a binary log and the first database is associated with a mysqlbinlog utility, wherein the mysqlbinlog utility is used to read the log of edits;

a memory for storing the log of edits;

a second database server programmed to receive as inputs to a second database: a first transformed file in a Structure Query Language (SQL) loader format of the second database, the first transformed file transformed from a first file comprising a first set of SQL statements, and a second transformed file in a SQL loader format of the second database, the second transformed file transformed from a second file comprising a second set of SQL statements, wherein the first file comprising the first set of SQL statements that is parsed from the log of edits between a first position and a second position, the first transformed file is transformed based in part on stored metadata related to the first set of SQL statements, including metadata related to a processing status of the first file, the second file comprising the second set of SQL statements is parsed from the log of edits between a third and fourth positions, and the second transformed file is transformed based in part on stored metadata related to the second set of SQL statements, including metadata related to processing status of the second file, information included in the log of edits between the third and fourth position was generated after information included in the log of edits between the first position and the second position, and the second file updates an update of the second database included in the first file, wherein the edits recorded in the binary log having log positions that are greater than the stored log position are parsed into the SQL statements of the first set or the SQL statements of the second set; and a third database server programmed to:

receive as inputs to a third database the metadata related to the first set of SQL statements, including metadata related to the processing status of the first file and a file name associated with the first file, wherein the processing status of the first file is updated in response to the first file being transformed into the first transformed file, wherein the first database is different from the third database; and wait a predetermined amount of time to repeat the transforming of the first transformed file and processing of the first file for updating, wherein multiple files each comprising SQL statements are generated and tracked using the third database, wherein the third database is controlled by a third server, wherein the first database is controlled by a first server and the second database is controlled by a second server, and wherein the log of updates is stored in a local memory of the first server and the transformed file is stored in a local memory of the second server, wherein the transforming of the first transformed file includes a transformation of data stored as dates and a transformation of table names.

7. The system according to claim 6, wherein the second database server is further programmed to parse the log of edits into SQL statements to generate the first file comprising the first set of SQL statements, and to convert the first file comprising the first set of SQL statements into the first transformed file having the SQL loader format of the second database.

8. A computer-readable storage medium encoded with executable program instructions to be executed in a database replication system comprising a first database, a second database and a third database, the program instructions for:

reading a generated log of the updates, from a first position to a second position, related to the first database, wherein the log of the updates is a binary log and the first database is associated with a mysqlbinlog utility, wherein the mysqlbinlog utility is used to read the log of the updates;

parsing the log of the updates into a file comprising Structure Query Language (SQL) statements;

storing metadata related to the file comprising the SQL statements in the third database, wherein the metadata includes a processing status of the file and a file name associated with the file, wherein the first database is different from the third database;

transforming the file comprising the SQL statements into a SQL loader format of the second database, based in part upon the stored metadata in the third database, wherein the stored metadata is updated according to the processing status of the file;

processing the transformed file as an input to the second database to make at least one update to the second database; and reading the generated log of the updates, from a third position to a fourth position, related to the first database, for transforming the log of the updates as input to the second database, wherein information included in the log of the updates between the third position and the fourth position was generated after information included in the log of the updates between the first position and the second position, and information included between the third position and the fourth position is for updating at least one update of the second database, wherein the updates recorded in the binary log having log positions that are greater than stored log position are parsed into the SQL statements;

waiting a predetermined amount of time to repeat the transforming of the file and the processing of the transformed file for updating, wherein multiple files each comprising SQL statements are generated and tracked using the third database, wherein the third database is controlled by a third server, wherein the first database is controlled by a first server and the second database is controlled by a second server, and wherein the log of the updates is stored in a local memory of the first server and the transformed file is stored in a local memory of the second server, wherein the transforming of the file includes a transformation of data stored as dates and a transformation of table names.

9. The computer-readable storage medium according to claim 8, wherein the program instructions are further for recording a log position of a last item in the log of edits that has been parsed.

10. The computer-readable storage medium according to claim 9, wherein the program instructions are further for parsing such that only the edits in the log having log positions that are subsequent to a last recorded log position are parsed.

11. The computer-readable storage medium according to claim 8, wherein the program instructions that carry out parsing invoke the mysqlbinlog utility.

* * * * *